(12) United States Patent
Bratton et al.

(10) Patent No.: US 11,788,320 B2
(45) Date of Patent: Oct. 17, 2023

(54) PROTECTIVE BARRIERS AND RELATED METHODS

(71) Applicant: Battelle Energy Alliance, LLC, Idaho Falls, ID (US)

(72) Inventors: Kenneth R. Bratton, Idaho Falls, ID (US); Teddy R. Reed, Idaho Falls, ID (US); Henry S. Chu, Idaho Falls, ID (US); Todd L. Johnson, Shelley, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 187 days.

(21) Appl. No.: 17/249,510

(22) Filed: Mar. 3, 2021

(65) Prior Publication Data

US 2022/0282520 A1  Sep. 8, 2022

(51) Int. Cl.
*E04H 17/16* (2006.01)
*E04H 17/00* (2006.01)
*E04H 5/04* (2006.01)
*H02B 5/00* (2006.01)
*F41H 5/24* (2006.01)

(52) U.S. Cl.
CPC ......... *E04H 17/166* (2013.01); *E04H 17/009* (2021.01); *E04H 5/04* (2013.01); *F41H 5/24* (2013.01); *H02B 5/00* (2013.01)

(58) Field of Classification Search
CPC .......... E01F 15/14; E01F 15/141; E04H 5/04; E04H 9/04; E04H 9/06; E04H 17/009; E04H 17/14; E04H 17/1413; E04H 17/1445; E04H 17/1447; E04H 17/1452; E04H 17/1456; E04H 17/1486; E04H 17/16; E04H 17/165; E04H 17/166; E04H 17/168; E04H 17/18; F41H 5/24; F41H 11/00; F41H 11/08; H02B 1/06; H02B 5/00; H02B 7/00
See application file for complete search history.

(56) References Cited

U.S. PATENT DOCUMENTS

| | | | |
|---|---|---|---|
| 3,963,219 A * | 6/1976 | D'Amico | E04H 17/1413 256/37 |
| 6,217,007 B1 * | 4/2001 | Grayson, II | E04H 17/168 256/12.5 |
| 6,554,257 B1 * | 4/2003 | Kenton | E04H 17/18 256/65.14 |
| 9,494,389 B2 * | 11/2016 | Kovalev | F41H 5/26 |
| 9,952,021 B2 * | 4/2018 | Ferguson | E04H 9/10 |
| 10,053,887 B2 | 8/2018 | Chu et al. | |
| 2010/0206158 A1 * | 8/2010 | Neethling | F41H 5/023 89/36.02 |
| 2011/0226122 A1 * | 9/2011 | Ciriscioli | F41H 5/263 89/905 |

(Continued)

*Primary Examiner* — Josh Skroupa
*Assistant Examiner* — Kevin J Baynes
(74) *Attorney, Agent, or Firm* — TraskBritt

(57) ABSTRACT

Corner assemblies for protective barriers for protecting assets (e.g., electrical power transformers and other substation components). The corner assembly includes two guide structures oriented perpendicular to each other. The corner assembly includes at least two protective member assemblies disposed within the two guide structures. Each protective member assembly includes two side members within protective members extending horizontally between the two side members.

20 Claims, 10 Drawing Sheets

(56) References Cited

U.S. PATENT DOCUMENTS

2015/0354926 A1* 12/2015 Gibson .................... F41J 11/00
  89/36.04
2019/0136567 A1* 5/2019 Bucarizza ............... E01F 9/692

* cited by examiner

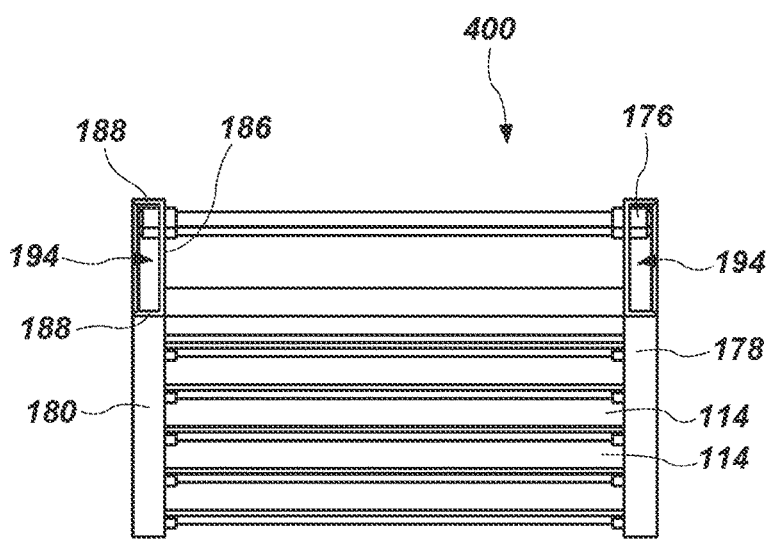
FIG. 4B
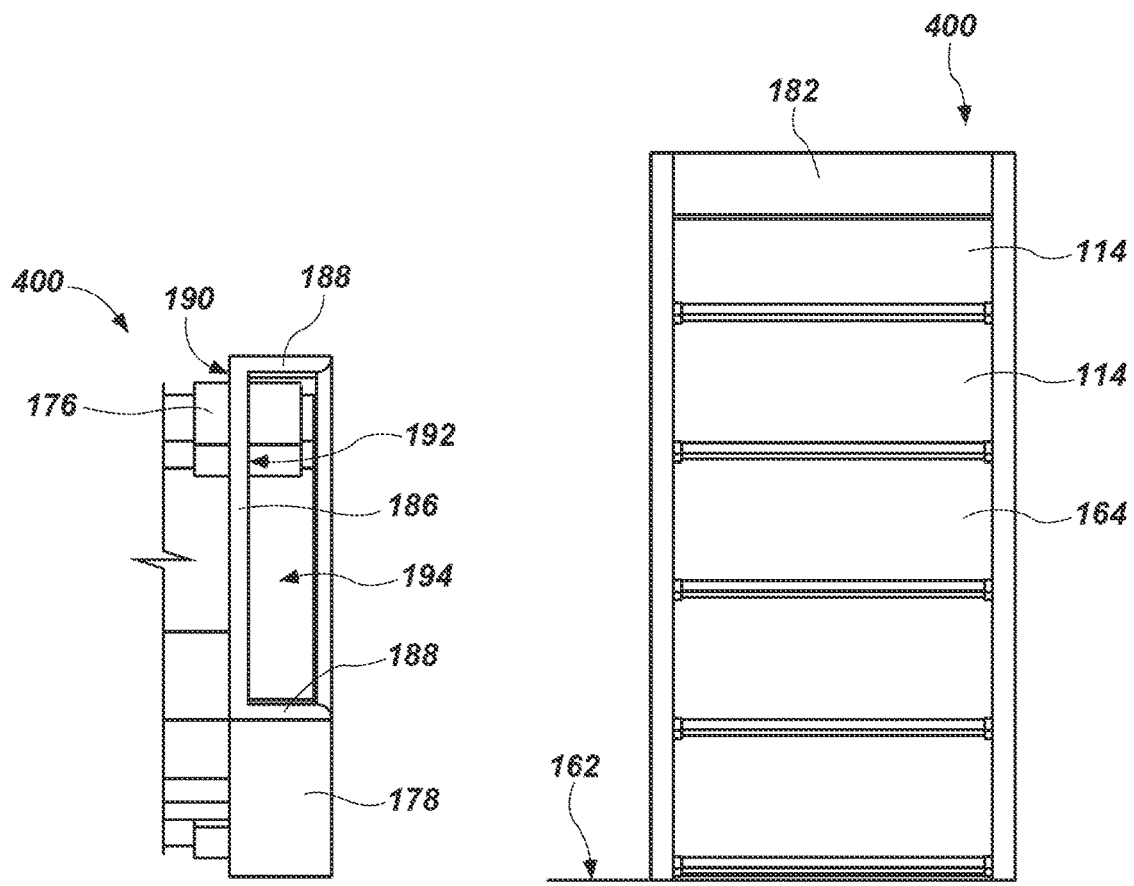
FIG. 4C
FIG. 4D

PROTECTIVE BARRIERS AND RELATED METHODS

STATEMENT REGARDING FEDERALLY SPONSORED RESEARCH OR DEVELOPMENT

This invention was made with government support under Contract Number DE-AC07-05ID14517 awarded by the United States Department of Energy. The government has certain rights in the invention.

TECHNICAL FIELD

This disclosure relates generally to protective barriers for protecting electrical power grid infrastructure including, without limitation, high voltage power transformers, assemblies and systems for incorporating protective barriers, and to related methods.

BACKGROUND

Electrical power transformers and substations are critical to electrical grids and to the electrical infrastructure serving industrial, commercial and residential users. Damaging an electrical power transformer or other substation components can cause mass power outages, resulting in economic and even personnel loss. As has been demonstrated in recent years, unprotected, very expensive electrical power transformers and other substation components can easily be rendered nonfunctional and destroyed by bullets from a high-powered rifle, such as a 7.62 mm automatic rifle. As a consequence, electrical power transformers and substations have become recognized as prime targets of terrorists and criminals.

Known barriers for protecting electrical power transformers are often non-portable, expensive, non-repairable, and/or ineffective. For example, current known concrete barriers are relatively non-portable and are not easily repairable. Further, movement and positioning of such concrete barriers often requires the use of heavy equipment. Known panel-type barriers for protecting electrical power transformers often require significant surface anchoring and even pier-type footings to provide stability. Thus, replacing damaged parts of the panel barriers can require construction equipment and machinery. In some cases, repairing such panel barriers can require excavation of the footing. Moreover, known barriers for protecting electrical power transformers are often not repairable on site, but must be transported offsite for repairs.

BRIEF SUMMARY

Embodiments of the disclosure include a corner assembly. The corner assembly includes a platform structure and a barrier structure extending vertically upward from the platform structure. The barrier structure may include a first rail member extending vertically upward from the platform structure, a second rail member extending vertically upward from the platform structure and oriented at least substantially parallel to the first rail member, a third rail member extending vertically upward from the platform structure and abutting a lateral side of the first rail member, a fourth rail member extending vertically upward from the platform structure and oriented at least substantially parallel to the third rail member, a first protective member assembly disposed between the first rail member and the second rail member, the first protective member assembly comprising a first plurality of vertically adjacent protective members extending horizontally between the first rail member and the second rail member in a first direction and a second protective member assembly disposed between the third rail member and the fourth rail member, the second protective member assembly comprising a second plurality of vertically adjacent protective members extending horizontally between the third rail member and the fourth rail member in a second direction, wherein a center lateral axis of each protective member of the first and second pluralities of vertically adjacent protective members forms an acute angle with a horizontal plane within a range of 55 to 75 degrees.

One or more embodiments of the disclosure includes a fence structure. The fence structure may include a first wall comprising protective bathers and extending in a first direction, a second wall comprising protective barriers and extending in a second direction, wherein the first direction is perpendicular to the second direction, and a corner assembly disposed at a junction of the first wall and the second wall and coupled to the first wall and the second wall. The corner assembly may include a platform structure and a barrier structure extending vertically upward from the platform structure. The bather structure may include a first guide structure extending vertically upward from the platform structure, a second guide structure extending vertically upward from the platform structure, a first protective member assembly disposed within the first guide structure and comprising: a first side member, a second side member, and a first plurality of vertically adjacent protective members extending horizontally between the first side member and the second side member in a first direction; and a second protective member assembly disposed with the second guide structure comprising: a third side member, a fourth side member, and a second plurality of vertically adjacent protective members extending horizontally between the third side member and the fourth side member in a second direction that is perpendicular to the first direction, wherein a center lateral axis of each protective member of the first and second pluralities of vertically adjacent protective members forms an acute angle with a horizontal plane within a range of 55 to 75 degrees.

Embodiments of the disclosure include a method of making a corner assembly. The method includes forming a platform structure, forming a first guide structure extending upward from the platform structure, forming a second guide structure extending upward from the platform structure, forming a first protective member assembly comprising: orienting a center lateral axis of each protective member of a first plurality of protective members to form an acute angle with a horizontal plane when the first protective member is installed in the corner assembly within a range of 55 to 75 degrees, securing a first longitudinal end of each protective member of the first plurality of protective members to a first side member such that the acute angle is maintained, and securing a second longitudinal end of each protective member of the first plurality of protective members to a second side member, sliding the first protective member assembly into the first guide structure, forming a second protective member assembly comprising: orienting a center lateral axis of each protective member of a second plurality of protective members to form an acute angle with a horizontal plane when the second protective member is installed in the corner assembly within a range of 55 to 75 degrees, securing a first longitudinal end of each protective member of the second plurality of protective members to a third side member such that the acute angle is maintained, and securing a second longitudinal end of each protective member of the second plurality of protective members to a fourth side member, and sliding the second protective member assembly into the second guide structure.

BRIEF DESCRIPTION OF THE DRAWINGS

For a detailed understanding of the present disclosure, reference may be made to the following detailed description, taken in conjunction with the accompanying drawings, in which like elements have generally been designated with like numerals, and wherein:

FIG. 4B is a top view of the protective member assembly of FIG. 4A;

FIG. 4C is an enlarged partial top view of a portion of the protective member assembly of FIG. 4B;

FIG. 4D is a frontal view of the protective member assembly of FIG. 4A;

DETAILED DESCRIPTION

Figure 1A:
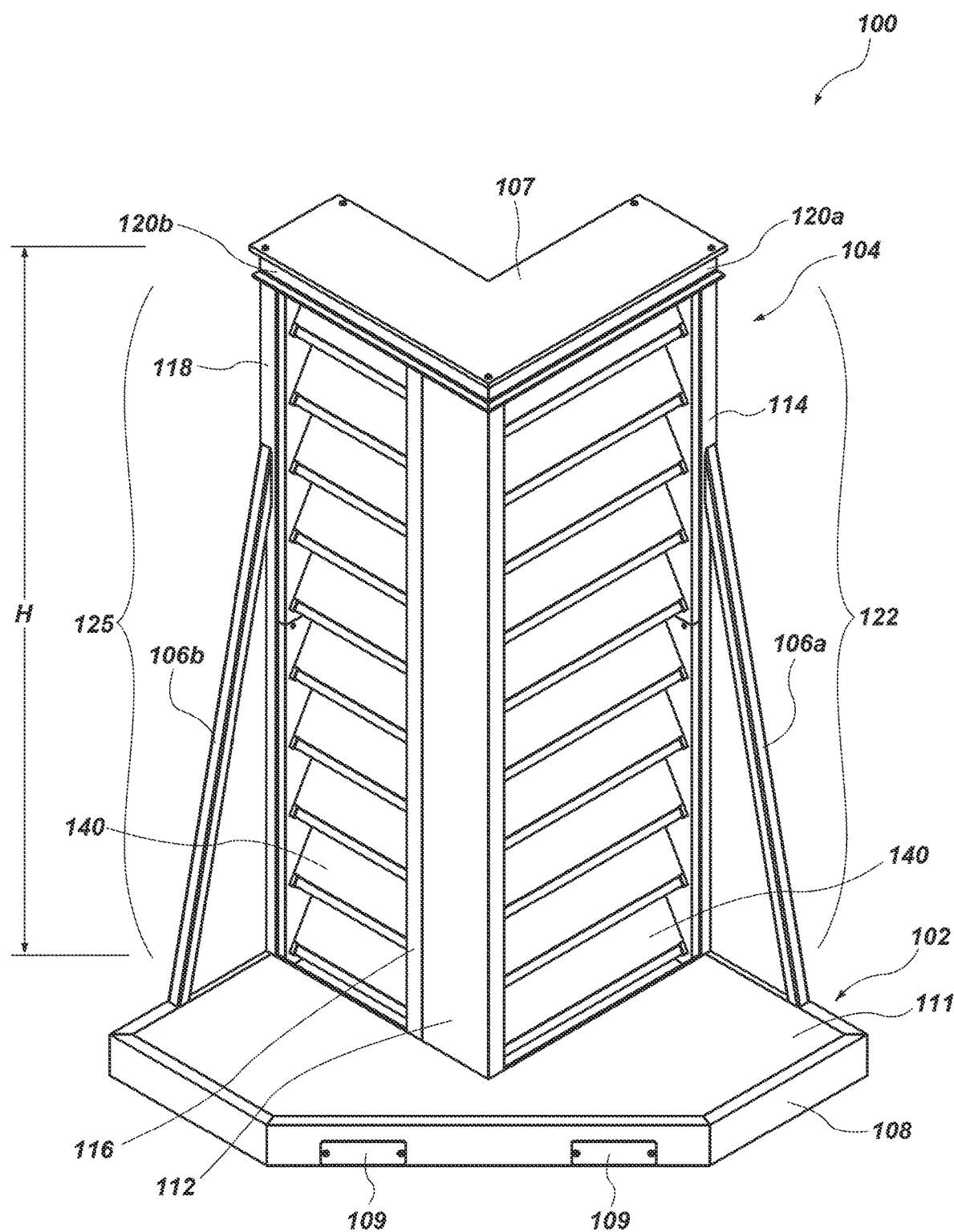
FIG. 1A is a front perspective view of a corner assembly according to one or more embodiments of the disclosure.

The illustrations included herewith are not meant to be actual views of any particular corner assembly, protective, fence structure, or portions thereof, but are merely idealized representations that are employed to describe embodiments herein. Elements and features common between figures may retain the same numerical designation except that, for ease of following the description, reference numerals begin with the number of the drawing on which the elements are introduced or most fully described.

As used herein, any relational term, such as "first," "second," "over," "beneath," "top," "bottom," "underlying," "up," "down," "lower," "upper," etc., is used for clarity and convenience in understanding the disclosure and accompanying drawings, and does not connote or depend on any specific preference, orientation, or order, except where the context clearly indicates otherwise. For example, these terms may refer to an orientation of elements of a corner assembly or protective barrier relative to a surface (e.g., ground, platform, etc.) on which the corner assembly or protective barrier may be positioned (e.g., as illustrated in the figures).

As used herein, the terms "vertical" and "horizontal" may refer to a drawing figure as oriented on the drawing sheet, and are in no way limiting of orientation of an apparatus, or any portion thereof, unless it is apparent that a particular orientation of the apparatus is necessary or desirable for operation in view of gravitational forces. For example, when referring to elements illustrated in the figures, the terms "vertical" or "horizontal" may refer to an orientation of elements of the protective barrier relative to a surface (e.g., ground, platform, etc.) on which the protective barrier may be positioned.

As used herein, the terms "comprising," "including," "containing," "characterized by," and grammatical equivalents thereof are inclusive or open-ended terms that do not exclude additional, un-recited elements or method steps, but also include the more restrictive terms "consisting of," "consisting essentially of," and grammatical equivalents thereof.

As used herein, the term "may" with respect to a material, structure, feature, or method act indicates that such is contemplated for use in implementation of an embodiment of the disclosure, and such term is used in preference to the more restrictive term "is" so as to avoid any implication that other compatible materials, structures, features, and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the singular forms following "a," "an," and "the" are intended to include the plural forms as well, unless the context clearly indicates otherwise.

As used herein, the term "and/or" includes any and all combinations of one or more of the associated listed items.

As used herein, the term "substantially" in reference to a given parameter, property, or condition means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, or even at least about 99% met.

As used herein, the term "about" used in reference to a given parameter is inclusive of the stated value and has the meaning dictated by the context (e.g., it includes the degree of error associated with measurement of the given parameter).

Some embodiments of the present disclosure relate to corner assemblies of protective barriers for protecting assets (e.g., electrical power transformers and substations) against ballistic, blast, and vehicular crash threats. For example, the corner assemblies may be oriented at interfaces between two linear walls of a barrier (e.g., a fence structure) to provide seamless protection. The corner assemblies may include protective members that are angled relative to a vertical axis to encourage deflection of projectiles that may be fired at the protective barriers and protected assets. Furthermore, the corner assemblies may not require anchoring to the ground in order to exhibit sufficient stability to withstand projectile or vehicular attacks and/or high wind bursts. Furthermore, a center of gravity of the corner assemblies may be sufficiently low relative to a horizontal surface upon which the corner assemblies may be positioned to provide stability to the corner assemblies. Moreover, the corner assemblies may be portable and easily repairable on site.

Figure 1B:
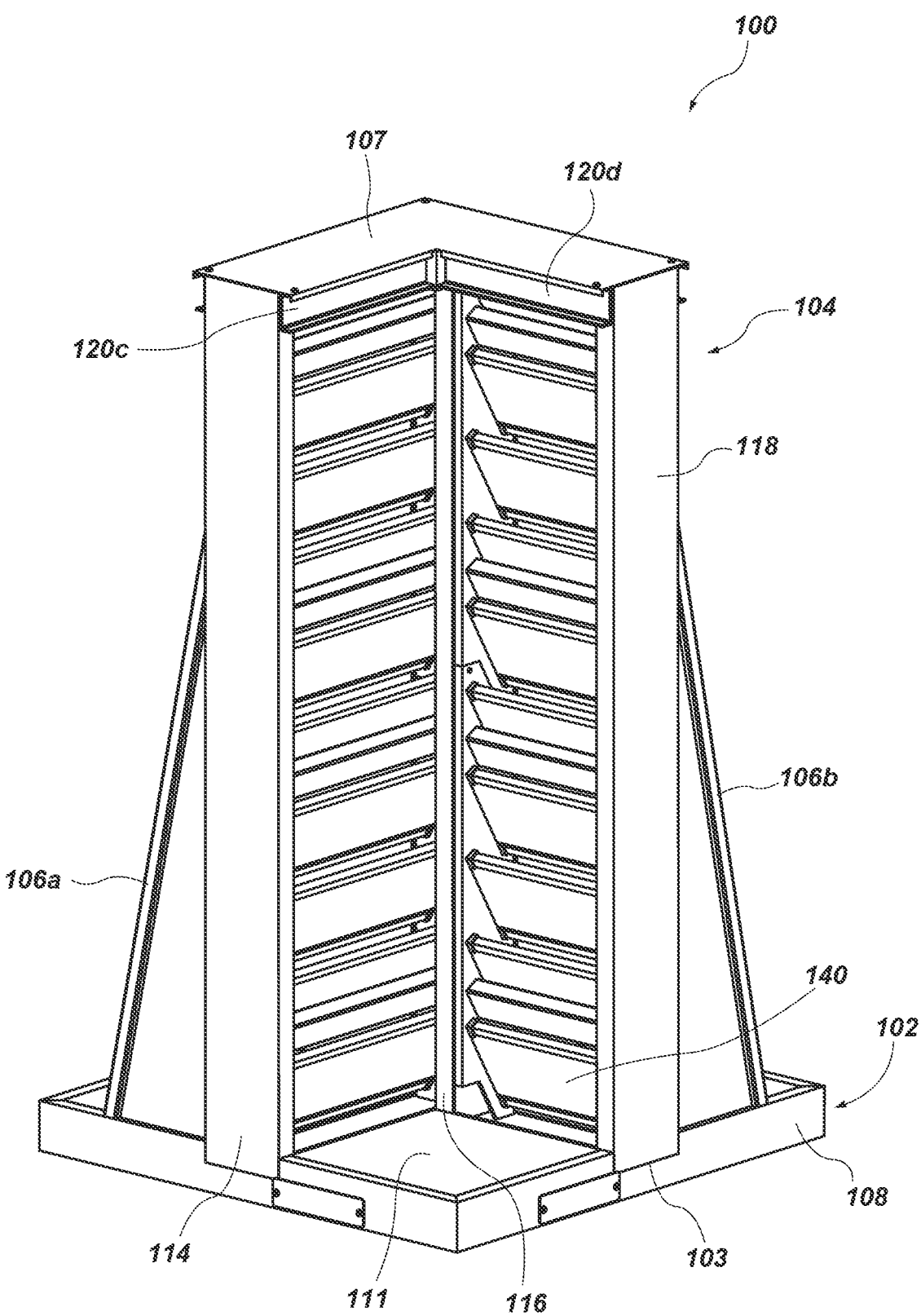
FIG. 1B is a rear perspective view of the corner assembly of FIG. 1A.
Figure 2:
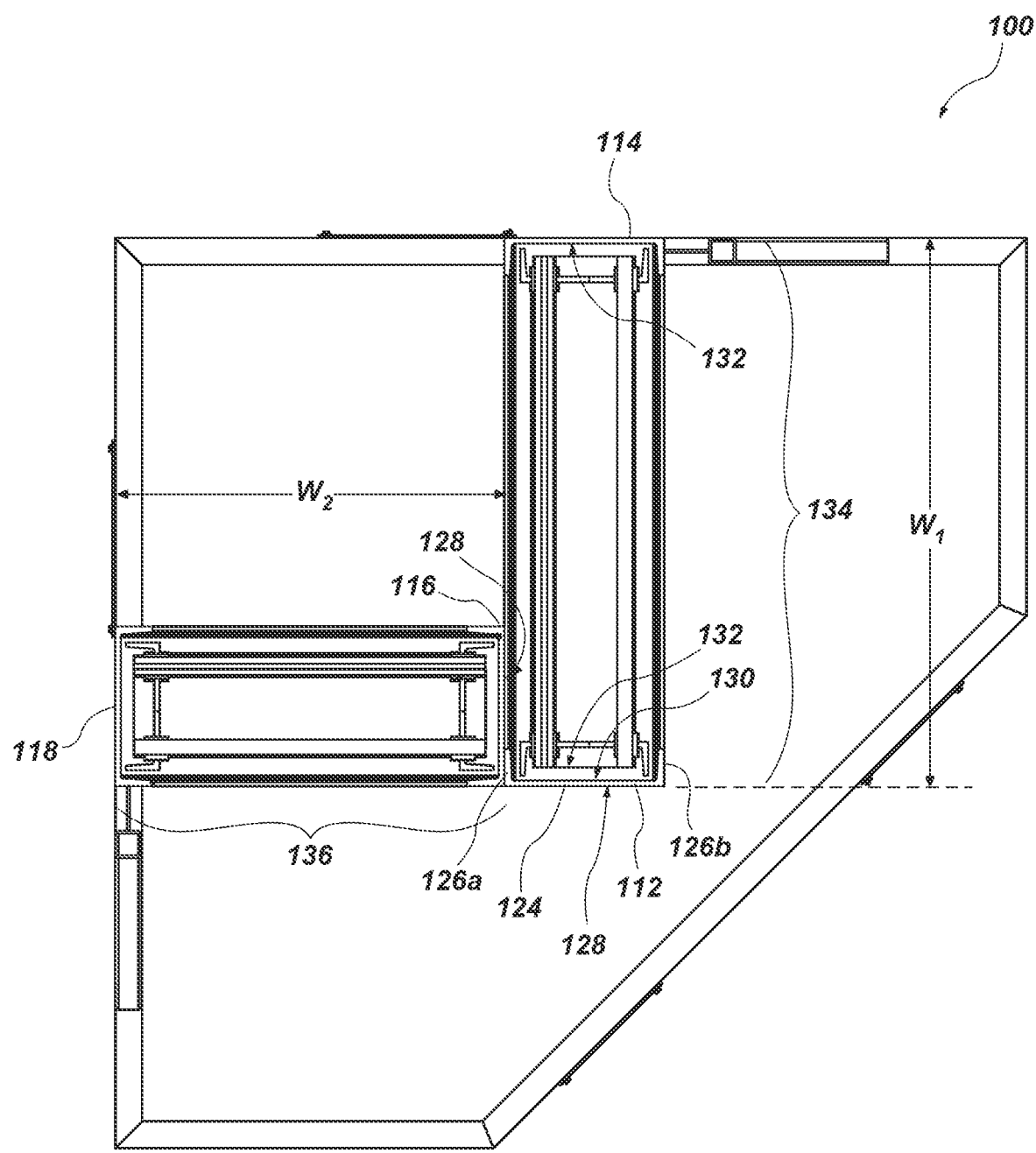
FIG. 2 is a top cross-sectional view of the corner assembly of FIG. 1A.

FIG. 1A is a front perspective view of a corner assembly 100 of a protective barrier assembly for protecting electrical power transformers and substations according to embodiments of the disclosure. FIG. 1B is a rear perspective view of the corner assembly of FIG. 1A. FIG. 2 is a top cross-sectional view of the corner assembly 100 of FIG. 1. Referring to FIGS. 1A-2 together, the corner assembly 100 may include a platform structure 102 and a barrier structure 104 extending vertically upward from the platform structure 102. In some embodiments, the platform structure 102 may have a recess 103 defined in an upper surface of the platform structure 102, and the barrier structure 104 may be disposed within the recess 103 and may be secured to the platform structure 102 within the recess 103 via fasteners, adhesives, welding, etc. In further embodiments, the barrier structure 104 may be disposed on and secured to the platform structure 102 (e.g., secured to an upper surface of the platform structure 102) via fasteners, adhesives, welding, etc. In additional embodiments, the barrier structure 104 may be disposed within a receiving notch (e.g., receiving cutout, receiving slot) of the platform structure 102. Additionally, the corner assembly 100 may further include support members 106a, 106b extending between the barrier structure 104 and the platform structure 102 and an upper plate 107 coupled to a top of the barrier structure 104.

In some embodiments, the platform structure 102 may include an outer shell 108 and an inner material 111 disposed (e.g., formed) within the outer shell 108. In some embodiments, the outer shell 108 may include a metal material. For example, the outer shell 108 may include a low carbon steel. For example, the low carbon steel may include A36 steel as classified by the American Society for Testing and Materials ("ASTM"). In some embodiments, the outer shell 108 may define an outer frame within which the inner material 111 may be disposed. In one or more embodiments, the inner material 111 may include a concrete material, a steel material, lead, or any other relatively high density material. As is discussed in further detail herein, a weight of the platform structure 102 may be selected such that a center of gravity of the corner assembly 100 is sufficiently low relative to a horizontal surface upon which the protective barrier may be positioned in order to provide stability to the protective barrier.

In some embodiments, the platform structure 102 may include one or more apertures 109 for receiving forklift forks. Furthermore, having one or more apertures 109 for receiving forklift forks may make the platform structure 102 and the corner assembly 100 relatively mobile.

In one or more embodiments, the barrier structure 104 may include a first rail member 112, a second rail member 114, a third rail member 116, and a fourth rail member 118, a plurality of cross members 120a-120d, at least one first protective member assembly 122, and at least one second protective member assembly 125. The first rail member 112 and the second rail member 114 may extend vertically upward from the platform structure 102. Furthermore, the first rail member 112 may be oriented at least substantially parallel to the second rail member 114. For instance, longitudinal axes of the first and second rails members 112, 114 may be parallel to each other. In some embodiments, longitudinal axes of the first and second rails members 112, 114 may be at least generally normal to the horizontal surface upon which the protective barrier may be positioned.

In some embodiments, each of the first and second rails members 112, 114 may include a C-channel. For example, each of the first and second rails members 112, 114 may include a C-channel having a shape of C12×30 as classified by American Institute of Steel Construction ("AISC"). Furthermore, the first and second rails members 112, 114 may include low carbon steel. For example, the low carbon steel may include A36 steel as classified by the ASTM.

Because each of the first and second rails members 112, 114 includes a C-channel, each of the first and second rails members 112, 114 may include a base portion 124 and two flanges 126a, 126b extending along a longitudinal length of the respective rail member. The base portion 124 of each of the first and second rails members 112, 114 may have an outer surface 128 and an inner surface 130. The flanges 126a, 126b may extend from the inner surface 130 of the base portion 124 in a direction normal to the inner surface 130 of the base portion 124 and may define a channel 132 with the inner surface 130 of the base portion 124 of the respective rail member. In some embodiments, the channel 132 of the first rail member 112 and the channel 132 of the second rail member 114 may face each other. For example, the first rail member 112 and the second rail member 114 may be oriented such that the inner surface 130 of the base portion 124 of the first rail member 112 faces the inner surface 130 of the base portion 124 of the second rail member 114. In other words, the first rail member 112 and the second rail member 114 may form a first guide structure 134 (e.g., within the channel 132 and between the flanges 126a, 126b of the rail members) into which the at least one first protective member assembly 122 may be inserted (e.g., slid, placed, etc.).

In substantially the same manner as the first and second rails members 112, 114 form the first guide structure 134, the third rail member 116 and the fourth rail member 118 may form a second guide structure 136 into which the at least one second protective member assembly 125 may be inserted. Furthermore, the third and fourth rails members 116, 118 may include low carbon steel. For example, the low carbon steel may include A36 steel as classified by American Society for Testing and Materials ("ASTM"). In some embodiments, a distance between the first and second rails members 112, 114 may be greater than a distance between the third rail member 116 and the fourth rail member 118. As a result, the at least one first protective member assembly 122 may have a width W1 that is greater than a width W2 of the at least one second protective member assembly 125.

In some embodiments, an orientation of the at least one first protective member assembly 122 may be perpendicular to an orientation of the at least one second protective member assembly 125. For example, a first plane extending between a center longitudinal axis of the first rail member 112 and a center longitudinal axis the second rail member 114 may be at least substantially perpendicular to a second plane extending between a center longitudinal axis of the third rail member 116 and a center longitudinal axis the fourth rail member 118. Furthermore, the at least one first protective member assembly 122 may at least partially overlap with the at least one second protective member assembly 125 in a direction of the width W1 of the at least one first protective member assembly 122 such that the at least one first protective member assembly 122 at least substantially covers a lateral side of the at least one second protective member assembly 125. As is described in greater detail below, the overlap between the at least one first protective member assembly 122 and the at least one second protective member assembly 125 may enable a fence structure including the corner assembly 100 to provide at least substantially 360° of protection (e.g., seamless protection) utilizing protective members 140.

Additionally, in one or more embodiments, the inner surface 130 of the base portion 124 of the third rail member 116 may be oriented perpendicular to the inner surface 130 of the base portion 124 of the first rail member 112. Furthermore, a flange 126a of the first rail member 112 may abut the outer surface 128 of the base portion 124 of the third rail member 116. Moreover, the outer surface 128 of the base portion 124 of the first rail member 112 may be substantially coplanar with an outer surface of a flange 126a of the third rail member 116.

The plurality of cross members 120a-120d may extend between the first rail member 112 and the second rail member 114 and between the third rail member 116 and the fourth rail member 118. For example, the plurality of cross members 120a-120d may form an outer frame to which the first rail member 112, the second rail member 114, the third rail member 116, and the fourth rail member 118 are coupled, and the plurality of cross members 120a-120d may provide structural support to the barrier structure 104. In some embodiments, the plurality of cross members 120a-120d may extend between the first rail member 112 and the second rail member 114 and between the third rail member 116 and the fourth rail member 118 proximate upper longitudinal ends of the first rail member 112, the second rail member 114, the third rail member 116, and the fourth rail member 118. The upper plate 107 may be coupled to upper surfaces of the plurality of cross members 120a-120d.

Furthermore, the plurality of cross members 120a-120d may include low carbon steel. For example, in some embodiments the low carbon steel may include A36 steel as classified by the ASTM.

Figure 5:
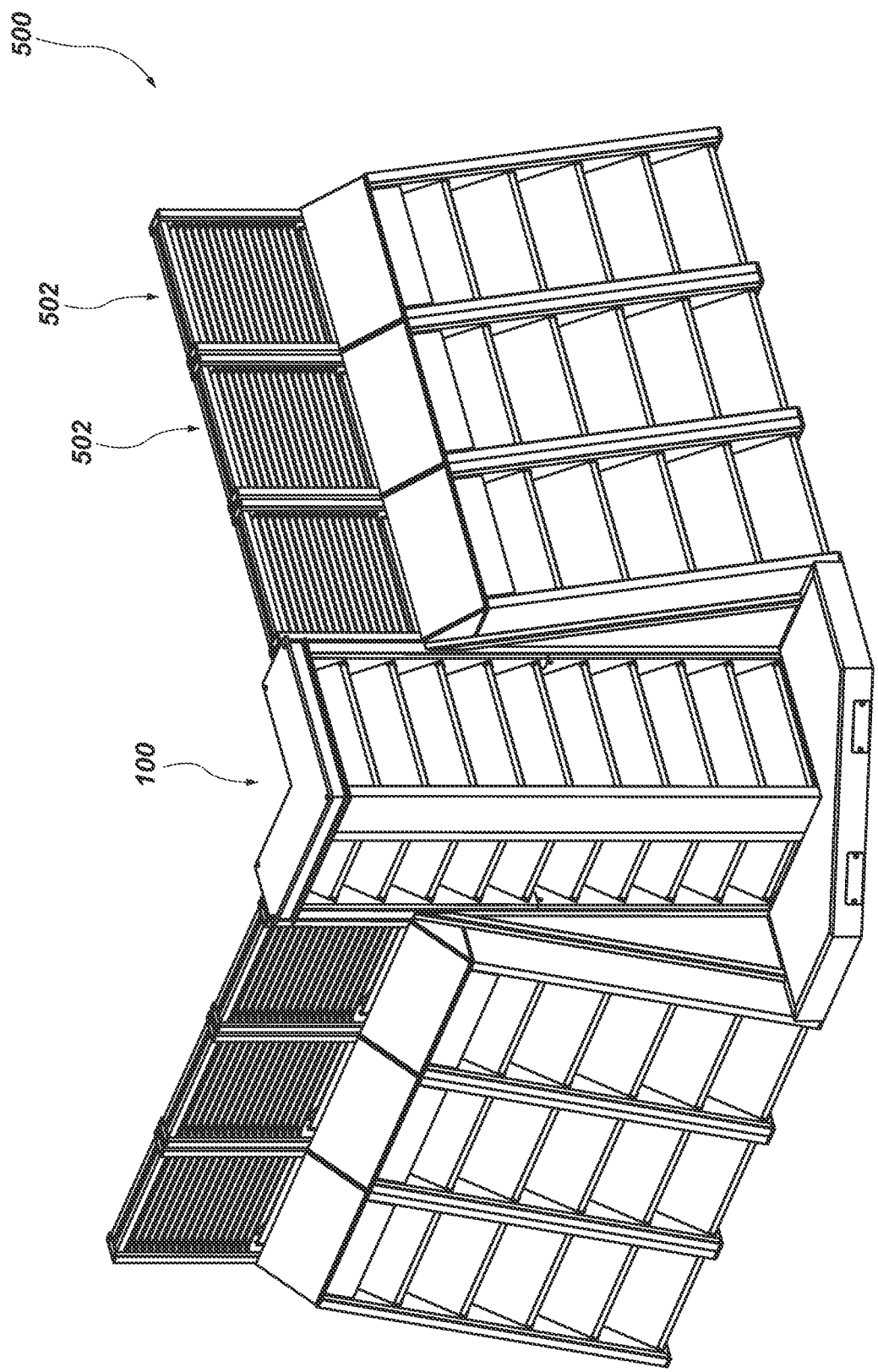
FIG. 5 is a perspective view of a fence structure including corner assemblies and protective barriers according to one or more embodiments of the disclosure.

As noted above, the support members 106a, 106b extend between the bather structure 104 and the platform structure 102. In particular, a first support member 106a may extend between a flange 126a of the fourth rail member 118 and an upper surface of the platform structure 102, and a second support member 106b may extend between a flange 126b of the second rail member 114 and the upper surface of the platform structure 102. In one or more embodiments, each of the support members 106a, 106b may have a general right triangle shape. As is discussed in greater detail below, the support members 106a, 106b may be shaped to cover gaps when the corner assembly 100 is assembled with protective barriers having differing profiles to form a fence structure (FIG. 5). The support members 106a, 106b may include low carbon steel. For example, in some embodiments the low carbon steel may include A36 steel as classified by the ASTM.

In some embodiments, the at least one first protective member assembly 122 may include at least two protective member assemblies stacked on top of each other. Likewise, the at least one second protective member assembly 125 may include at least two protective member assemblies stacked on top of each other.

In some embodiments, the elements and structure (e.g., angles of members, weight of portions, orientation of members, etc.) of the platform structure 102 and the barrier structure 104 of the corner assembly 100 may result in a center of gravity of the corner assembly 100 being located at a distance from a horizontal surface upon which the corner assembly 100 may be placed which is equal to or less than half of an overall height H of the corner assembly 100. Having a relatively low center of gravity (e.g., around or below half the overall height of corner assembly 100), may provide additional stability to the corner assembly 100. For example, unlike convention barriers used in the industry to protect assets, the corner assembly 100 of the present disclosure may be freestanding and may not require anchors in the ground in order to maintain a position relative to an asset and/or to prevent the corner assembly 100 from tipping over when subjected to wind and/or projectiles.

Figure 3A:
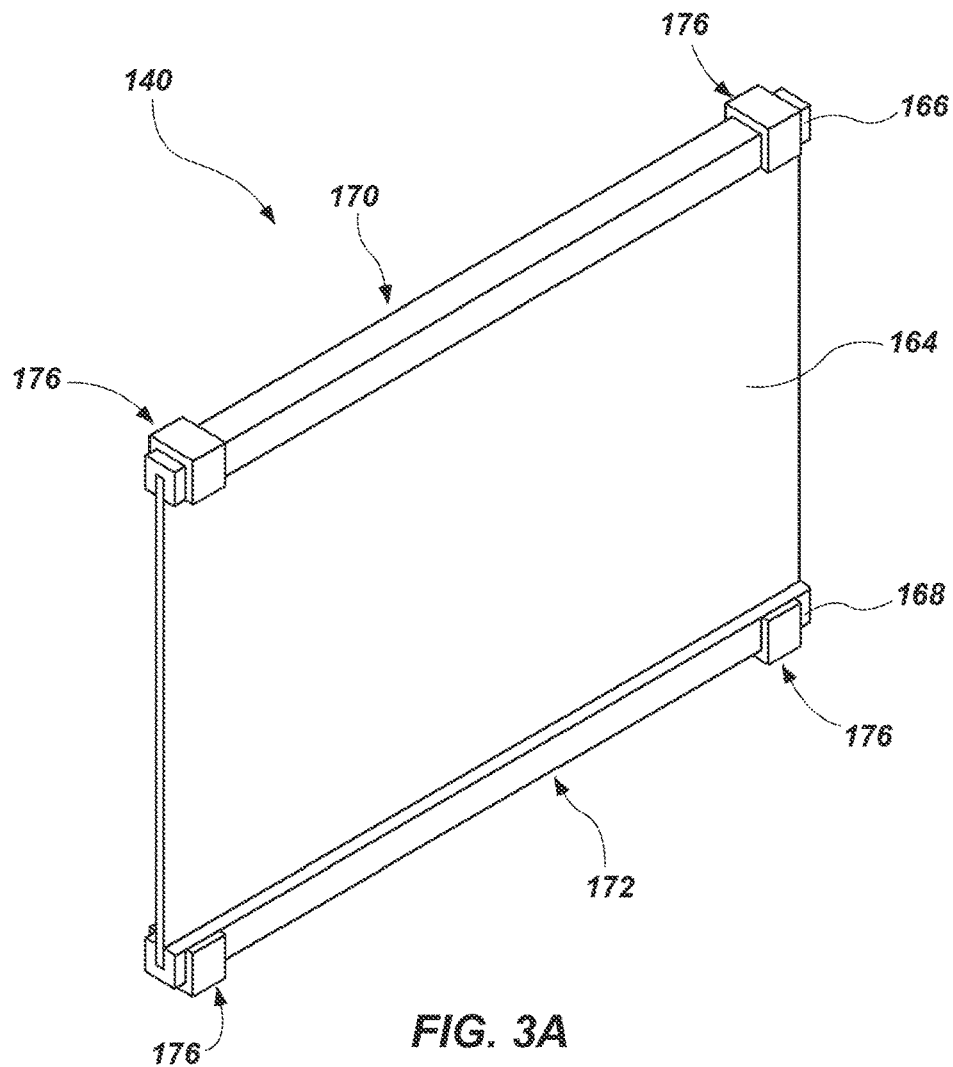
FIG. 3A is a perspective view of a protective member of a corner assembly according to one or more embodiments of the disclosure.

As is described in further detail below, each of the at least one first protective member assembly 122 and the at least one second protective member assembly 125 may include a plurality of protective members 140. FIG. 3A is a perspective view of a protective member 140 of a given protective member assembly (FIGS. 1A-2) according to embodiments of the disclosure. The protective member 140 may include a plate 164, a first frame member 166, and a second frame member 168. The first frame member 166 may be attached to a first lateral end 170 of the plate 164, and the second frame member 168 may be attached to a second lateral end 172 of the plate 164. The first and second frame members 166, 168 may extend along the lengths of the first and second lateral ends 170, 172, respectively.

Figure 3B:
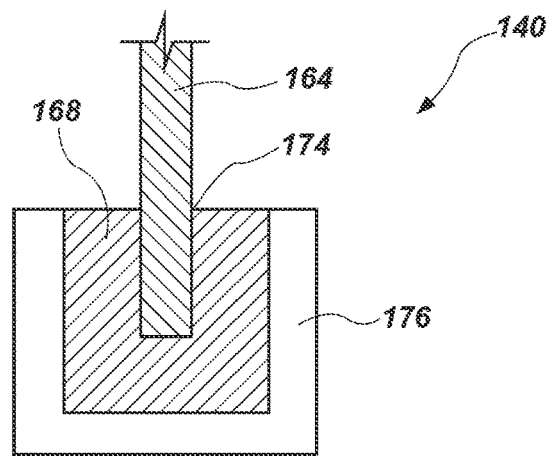
FIG. 3B is a partial cross-sectional view of the protective member of FIG. 3A.

FIG. 3B is a partial cross-sectional view of a lateral end of the plate 164 and a frame member (e.g., either the first frame member 166 or the second frame member 168) of the protective member 140. Referring to FIGS. 3A and 3B together, in some embodiments, the first and second frame members 166, 168 may have rectangular cross sections. Furthermore, each of the first and second frame members 166, 168 may include a recess 174 defined in one side thereof, and the plate 164 may be fitted into the recesses 174 of the first and second frame members 166, 168. In some embodiments, the plate 164 may be press fitted into recesses 174 of the first and second frame members 166, 168. In one or more embodiments, the recesses 174 may be formed having a width that is smaller than a thickness of the plate 164, and the plate 164 may be hydraulically pressed into the recess 174 to provide an interference fit. For example, the recesses 174 may be formed about 0.006 inch to about 0.008 inch smaller than a thickness of the plate 164.

In some embodiments, the recesses 174 may have a depth within a range of about 0.5 inch (½") to about 1.25 inches (1¼"). In one or more embodiments, the recesses 174 may have a depth within a range of about 0.75 inch (¾") to about 1.0 inch (1"). For example, the recesses 174 may have a depth of at least about 0.94 inch (15/16"). In some embodiments, the press fitting of the plate 164 into the first and second frame members 166, 168 may provide additional support to the plate 164. For example, press fitting the plate 164 into the first and second frame members 166, 168 may reduce a likelihood that the plate 164 will deform when struck with a projectile (e.g., a round of ammunition). In some embodiments, the plates 164 of the protective members 140 may have longitudinal lengths within a range of about 40 to about 50 inches. In one or more embodiments, the plates 164 may have longitudinal lengths within a range of about 43 to about 47 inches. For example, the plates 164 may have longitudinal lengths of at least about 45 inches. In some embodiments, the plates 164 of the protective members 140 may have lateral lengths within a range of about 15 to about 25 inches. In some embodiments, the plates 164 may have longitudinal lengths within a range of about 20 to about 23 inches. For example, the plates 164 may have lateral lengths of at least about 21.625 inches (21⅝").

In some embodiments, the plates 164 of the protective members 140 may have a thickness within a range of about 0.44 inch (7/16") to about 0.50 inch (½"). Furthermore, the plates 164 may be MIL-DTL-46100 tempered high-hardness wrought steel armor plates as classified by Department of Defense. In some embodiments, the first and second frame members 166, 168 may be formed from a 1.5 inch by 1.5 inch (1.5"×1.5") square bar having recess 174 machined therein. Furthermore, the first and second frame members 166, 168 may include low carbon steel. For example, in some embodiments the low carbon steel may include A36 steel as classified by the ASTM.

In some embodiments, the protective members 140 may include at least one shock absorber 176. In some embodiments, shock absorbers 176 may wrap around portions of the first and second frame members 166, 168 of the protective member 140. For example, when the first and second frame members 166, 168 have rectangular cross-sections, the shock absorber 176 may wrap around the three sides of the first and second frame members 166, 168 that do not have the recesses 174 defined therein. In other embodiments, the shock absorber 176 may also wrap around any exposed portions of the sides of the first and second frame members 166, 168 that do have the recesses 174 defined therein. In some embodiments, the shock absorber 176 may include a rubber material. For example, the shock absorber 176 may include one or more of nitrile, ethylene-propylene, fluorocarbon, chloroprene, silicone, fluorosilicone, polyacrylate, ethylene acrylic, styrene-butadiene, polyurethane, and natural rubber. In some embodiments, the shock absorber 176 made be made of Linagard BB manufactured by Linatex Corporation of America. In some embodiments, a thickness of the shock absorber 176 may be within a range of about 0.13 inch (⅛") to about 0.50 inch (½"). For example, a thickness of the shock absorber 176 may be about 0.25 inch (¼").

Figure 4A:
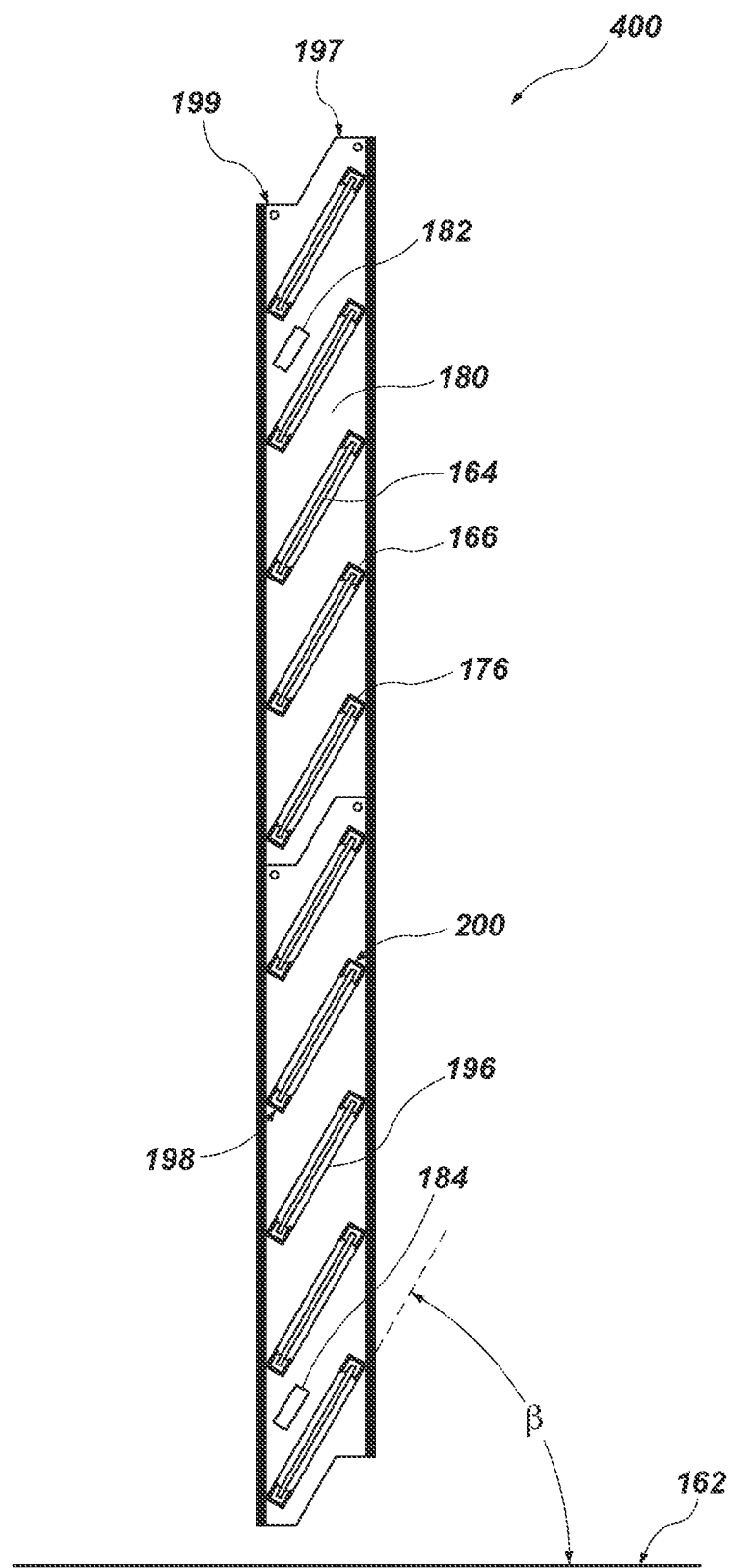
FIG. 4A is a cross-sectional view of a protective member assembly of a corner assembly according to one or more embodiments of the disclosure.

FIG. 4A is a cross-sectional side view of a protective member assembly 400 of the corner assembly 100 (FIGS. 1A and 1B) according to embodiments of the disclosure. The at least one first protective member assembly 122 and/or the at least one second protective member assembly 125 may include one or more of the protective member assemblies 400. FIG. 4B is a top perspective view of the protective member assembly 400 of FIG. 4A. FIG. 4C is an enlarged partial top side view of a portion of the protective member assembly 400 of FIG. 4B. FIG. 4D is a frontal view of the protective member assembly 400 of FIG. 4A. Referring to FIGS. 4A-4D in combination, the protective member assembly 400 may include a first side member 178, a second side member 180, a plurality of protective members 140, at least a top support member 182, and at least a bottom support member 184.

The first side member 178 may be oriented parallel to the second side member 180 (e.g., a longitudinal axis of the first side member 178 may be parallel to a longitudinal axis of the second side member 180), and the plurality of protective members 140 may extend between the first side member 178 and the second side member 180. Both the first side member 178 and the second side member 180 may include a C-channel. In some embodiments, the first and second side members 178, 180 may include C-channels having a shape of C10×25 as classified by AISC. Furthermore, the first and second side members 178, 180 may include low carbon steel. For example, in some embodiments the low carbon steel may include A36 steel as classified by the ASTM. Each of the first and second side members 178, 180 may include a base portion 186 and two flanges 188 extending along longitudinal lengths of the first and second side members 178, 180. The base portions 186 of the first and second side members 178, 180 may each have an outer surface 190 and an inner surface 192, and the flanges 188 may extend from the inner surfaces 192 of the base portions 186 in directions normal to the inner surfaces 192 of the base portions 186 and may define channels 194 with the inner surfaces 192 of the base portions 186 of the first and second side members 178, 180. The first and second side members 178, 180 may be oriented opposite to each other. In other words, the channels of the first side member 178 and the second side member 180 may be facing away from each other. Stated another way, the outer surface 190 of the first side member 178 may face the outer surface 190 of the second side member 180.

The first and second side members 178, 180 may each have a plurality of slots 196 formed therein. For example, the plurality of slots 196 may extend through the base portions 186 of the first and second side members 178, 180. The slots 196 of the plurality of slots 196 may be sized and shaped to receive a longitudinal end of a protective member 140. For every protective member 140 included in the protective member assembly 400, there may be a correlating slot 196 in the first side member 178 for receiving a first longitudinal end of the protective member 140 and another, mutually aligned slot 196 in the second side member 180 for receiving a second longitudinal end of the protective member 140. The slots 196 of the plurality of slots 196 formed in a respective side member may be oriented parallel to the each other. In other words, the longitudinal axes of the slots 196 of the plurality of slots 196 may be parallel to each other.

In some embodiments, the slots 196 of the plurality of slots 196 may have a width within a range of about 1.25 inches (1¼") to about 2.75 inches (2¾"). In some embodiments, the slots 196 of the plurality of slots 196 may have a width within a range of about 1.75 inches (1¾") to about 2.25 inches (2¼"). For example, the slots 196 of the plurality of slots 196 may have a width of about 2.0 inches. In some embodiments, the slots 196 of the plurality of slots 196 may have a length within a range of about 15 inches to about 30 inches. In some embodiments, the slots 196 of the plurality of slots 196 may have a length within a range of about 20 inches to about 25 inches. For example, the slots 196 of the plurality of slots 196 may have a length of about 23.25 inches (23¼").

Each slot 196 of the plurality of slots 196 may be inclined relative to the horizontal surface 162 upon which the corner assembly 100 may be placed. In other words, the slots 196 of the plurality of slots 196 may be defined such that a longitudinal axis of each slot 196 of the plurality of slots 196 forms an acute angle $\beta$ with the horizontal surface 162 when the corner assembly 100 rests on a supporting surface. In some embodiments, the angle $\beta$ may be within a range of about 50° to about 70°. In some embodiments, the angle $\beta$ may be within a range of about 55° to about 65°. For example, the angle $\beta$ may be at least about 60°. Accordingly, the plurality of protective members 140 that may be inserted into the plurality of slots 196 may be oriented at the same angle $\beta$ relative to the horizontal plane 162 when inserted into the plurality of slots 196. For example, a center lateral axis of each of the plurality of protective members 140 may form the acute angle $\beta$ with the horizontal surface 162. Having the plurality of protective members 140 oriented at the angle $\beta$ relative to the horizontal plane 162 may encourage projectiles (e.g., rounds of ammunition) that strike the protective members 140 to ricochet off of the protective members 140 instead of embedding into the protective members 140 and/or penetrating the protective members 140. For example, having the plurality of protective members 140 oriented at the angle $\beta$ of at least about 75° relative to the horizontal surface 162 may increase a probability that projectiles striking the protective members 140 will ricochet off of the protective members 140. Thus, having the protective members 140 oriented at an angle $\beta$ relative to the horizontal plane 162 may help to preserve the protective members 140 and may help to reduce damage experienced by the protective members 140 when stopping and/or deflecting projectiles that may be fired at an asset which the protective members 140 of corner assembly 100 are positioned to protect.

Each slot 196 of the plurality of slots 196 may have a lower end 198 and an upper end 200. Furthermore, the plurality of slots 196 may be oriented relative to each other such that a lower end 198 of a first slot 196 of the plurality of slots 196 extends lower vertically than an upper end 200 of an adjacent second slot 196 that is below the first slot 196, wherein mutually vertically adjacent slots are positioned in partially overlapping relationship. Moreover, an upper end 200 of the first slot 196 of the plurality of slots 196 may extend higher vertically than a lower end 198 of an adjacent third slot 196 that is above the first slot 196. Thus, when the plurality of protective members 140 are inserted into the plurality of slots 196, each of the plurality of protective members 140 may partially vertically overlap one or more vertically adjacent protective members 140. In other words, a lower lateral end of the first protective member 140 may extend lower vertically than an upper lateral end of the second protective member 140. As a result, when the corner assembly 100 is viewed in a horizontal direction, as depicted in FIG. 4D, there may not be any vertical gaps between adjacent protective members 140 of the plurality of protective members 140 of the protective member assembly 400.

In some embodiments, a distance by which the first protective member 140 may overhang the second protective member 140 may be at least equal to a diameter of a round of ammunition that the corner assembly 100 is intended and/or anticipated to stop or deflect. For example, the protective members 140 may overhang each other by a distance measured vertically of at least about 0.22 inch (e.g., diameter of a .22 caliber round). In some embodiments, the protective members 140 may overhang each other by a distance of at least about 0.308 inch (e.g., diameter of a 0.30-06 round). In some embodiments, the protective members 140 may overhang each other by a distance of at least about 0.50 inch (e.g., diameter of a .50 caliber round). In some embodiments, the plates 164 of the protective members 140 may overhang each other by the distance listed above. Thus, projectiles (e.g., rounds) that are traveling toward the protective members 140 in horizontal directions or at a decline would not be able to pass through the protective member assembly 400 without striking at least one of the plates 164 of the plurality of protective members 140 of the protective member assembly 400. Furthermore, for projectiles traveling toward the plurality of protective members 140 at an incline, the projectiles would have to be traveling upwardly in a direction that is at least about the same angle at which the protective members 140 are inclined relative to the horizontal surface 162 in order to pass through the protective member assembly 400 without striking at least one of the protective members 140. As a result, if the projectiles are traveling at a sufficient upward incline to travel through the protective member assembly 400 without striking a protective member 140, the projectiles would almost certainly miss any asset that the corner assembly 100 is positioned to protect.

In some embodiments, the lower ends 198 of the plurality of slots 196 may be spaced at least some distance horizontally from the upper ends 200 of adjacent slots 196 of the plurality of slots 196. Accordingly, the lower lateral ends of the plurality of protective members 140 may be spaced at least some distance horizontally from the upper lateral ends of adjacent protective members 140 of the plurality of protective members 140. Having horizontal spaces between adjacent protective members 140 of the plurality of protective members 140 may allow for air diffusion through the corner assembly 100. Allowing air diffusion through the corner assembly 100 may reduce adverse consequences of wind forces experienced by the corner assembly 100, and thus, may reduce chances that the corner assembly 100 will be moved, tipped over, and/or damaged by high winds. Furthermore, allowing air diffusion through the corner assembly 100 may, in some instances, increase stability of the corner assembly 100 by applying a downward force in response to wind.

Additionally, each of the first and second side members 178, 180 may include a key feature 197 and a receiving feature 199 for receiving a key feature of another side member on the longitudinal ends thereof such that when the at least one first protective member assembly 122 and/or the at least one second protective member assembly 125 include two or more protective member assemblies, the side members of the two of more protective members assemblies may mate and at least partially lock the two or more protective member assemblies in place.

As shown in FIG. 4A, when the plurality of protective members 140 are inserted into the slots 196, the shock absorbers 176 of the protective members 140 may press against interior edges of the plurality of slots 196. The shock absorbers 176 may be used to suspend the plates 164 and the first and second frame members 166, 168 of the plurality of protective members 140 within the plurality of slots 196, and the plates 164 and first and second frame members 166, 168 of the plurality of protective members 140 may not contact the interior edges of the plurality of slots 196. The shock absorbers 176 may assist in maintaining integrity of the corner assembly 100 and preventing or reducing damage to the corner assembly 100. For example, the shock absorbers 176 may absorb at least some of an impact (e.g., provide cushion) when a projectile strikes a protective member 140 of the plurality of protective members 140, reducing the likelihood that a plate 164 of a protective member 140 will be penetrated, even by a high velocity, high caliber projectile. Furthermore, the shock absorbers 176 may reduce a likelihood that a protective member 140 will deform to absorb an impact of a projectile as the shock absorbers 176 will absorb at least a portion of the impact. As shown in FIG. 4C, in some embodiments, the shock absorbers 176 may extend only along portions of the first and second frame members 166, 168 of the plurality of protective members 140 that are inserted into the plurality of slots 196.

In view of the foregoing, the at least one first protective member assembly 122 may include a first side member 178, a second side member 180, and a first plurality of protective members 140 installed in a plurality of slots 196, and the at least one second protective member assembly 125 may include a first side member 178, a second side member 180, a second plurality of protective members 140 installed in a plurality of slots 196. Furthermore, in some embodiments, the structural configuration of the at least one second protective member assembly 125 may be the same as the structural configuration of the at least one first protective member assembly 122.

Referring to FIGS. 1A-4D, the corner assemblies 100 described may be utilized with other protective barriers (described below) to form a barrier (e.g., a fence structure) around an asset. Furthermore, the corner assemblies 100 may at least substantially seal spaces between walls (e.g., linear walls or linear portions of walls) of the barrier (e.g., a fence structure).

Additionally, because each of the at least one first and at least one second protective member assemblies 122, 125 are insertable (e.g., slidable) into the first and second guide structures 134, 136, the at least one first and at least one second protective member assemblies 122, 125 may be quickly and easily repaired. For example, when a protective member assembly of the corner assembly 100 becomes damaged, a user may simply slide the damaged protective member assembly out of the respective guide structure and insert another, replacement protective member assembly into the respective guide. Furthermore, because the protective members 140 are suspended by the shock absorbers 176 within the plurality of slots 196 of the side members, individual protective members 140 may be quickly and easily replaced after removing the respective protective member assembly from the respective guide structures 134, 136 by sliding the damaged protective member 140 out of its respective slots 196 and sliding a replacement protective member 140 into the slots. Thus, the corner assembly 100 of the disclosure may provide advantages over known protective barriers, as the corner assembly 100 of the disclosure may be repaired on site with common tools and little to no on site welding. Furthermore, because the corner assembly 100 can be easily disassembled, the corner assembly 100 may be portable and relatively easy to move in comparison to known protective barriers.

Live-fire ballistic testing performed by the inventors has shown that the first and second protective member assemblies 122, 125, when inserted into the first and second guides sturctures 134, 136 and having protective members 140 with a thickness within the range of about 0.44 inch (7⁄16") to about 0.50 inch (½") and being angled at least about 60° relative to a horizontal plane, are able to withstand .50 caliber armor piercing ammunition.

FIG. 5 shows a perspective view of a portion of a fence structure 500 of protective barriers 502 and corner assemblies 100 that can be oriented around an asset (e.g., an electrical power transformer) according to embodiments of the present disclosure. The protective barriers 502 may include any of the protective barriers described in U.S. Pat. No. 10,053,887, to Chu et al., issued Aug. 21, 2018, the disclosure of which is incorporated in its entirety by reference herein. The protective barriers 502 may be freestanding and may be attached together in side-by-side fashion to form walls (e.g., linear walls) of protective barriers in order to protect larger assets. For example, the protective barriers 502 may be attached together laterally with one or more fasteners. Furthermore, the corner assemblies 100 may be disposed at junctions (e.g., meetings) of the walls of protective barriers 502 to connect one wall to another and to seal gaps between walls. For instance, the corner assemblies 100 may be attached to the walls of protective barriers with one or more fasteners.

The corner assemblies 100 may enable the fence structure 500 to provide 360° protection (e.g., seamless protection) to the asset. For example, the corner assemblies 100 in conjunction with the protective barriers 502 may provide at least substantially 360° of protection having protective members 140. Additionally, the corner assemblies 100 may provide a transition joint where walls of the protective barriers 502 meet of the fence structure 500 meet. Furthermore, the corner assemblies 100 may provide additional stability to the protective bathers 502 of the fence structure 500. Moreover, the corner assemblies 100 and the protective barriers 502 may provide a modular fence structure 500 that can be relatively easily constructed and deconstructed on site. Moreover, because the fence structure 500 is modular, the protective members 140 of the fence structure 500 can relatively easily be removed and replaced. Additionally, because the fence structure 500 is modular, a size of the fence structure 500 can relatively easily be increased or decreased based on an asset size.

As noted above, the corner assemblies 100 and the protective barriers 502 may be freestanding. Furthermore, because the corner assemblies 100 and the protective barriers 502, and as a result, the fence structure 500 is freestanding, a cost for deploying and installing the fence structure 500 may be reduced relative to conventional barriers. For example, relatively expensive equipment for transporting the fence structure and forming and installing (e.g., ribs and anchors) are unnecessary for installing the fence structure 500. Moreover, the deploying and installing the fence structure 500 does not require technical training and requires a reduced amount of resources and manpower for installing the fence structure 500. Additionally, the materials of the corner assemblies 100 and the protective barriers 502 may be commercially available, and as such, the protective barriers may be inexpensive to produce and maintain.

Figure 6:
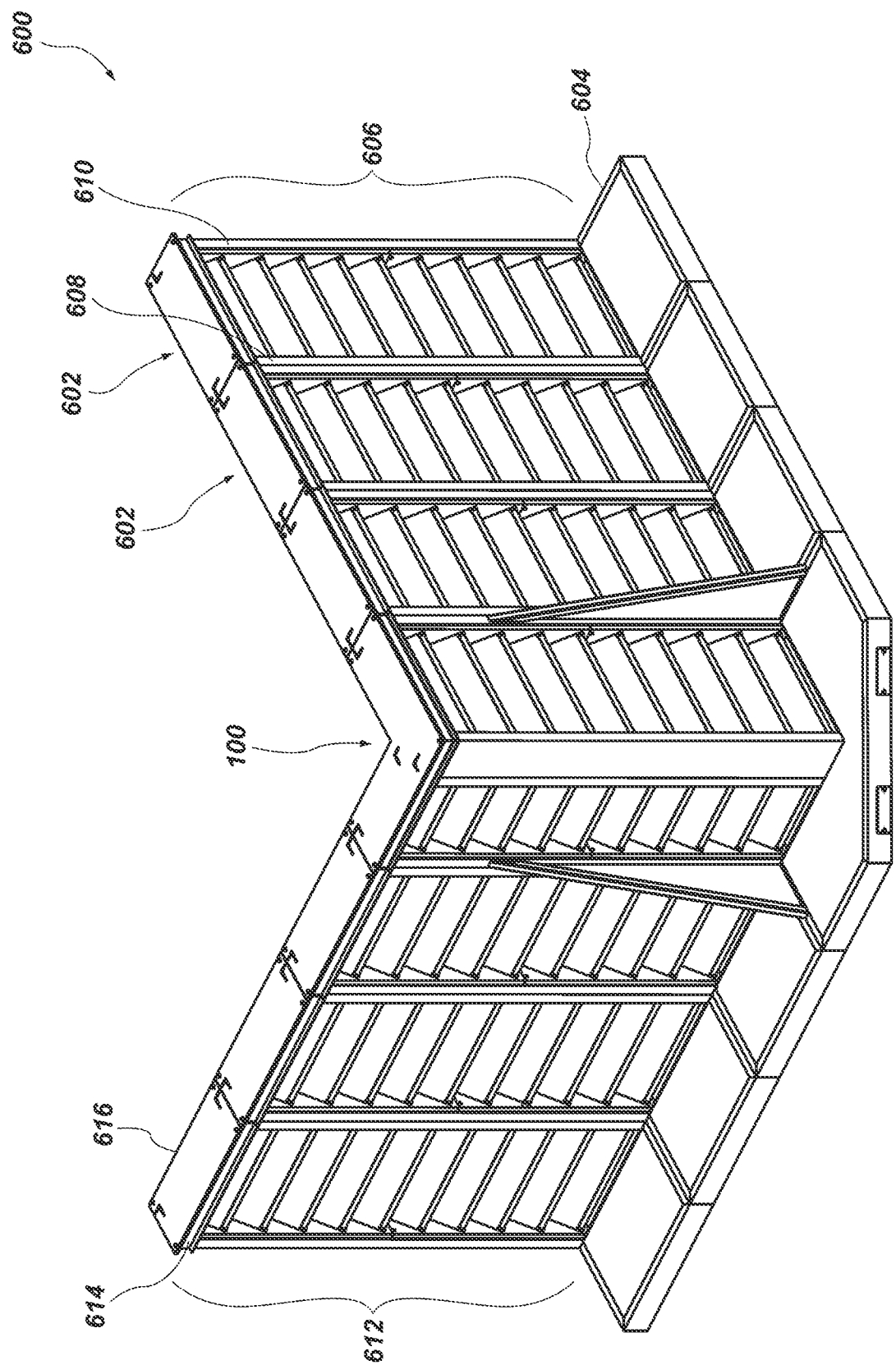
FIG. 6 is a perspective view of a fence structure including corner assemblies and protective barriers according to one or more embodiments of the disclosure.

FIG. 6 shows a perspective view of a portion of a fence structure 600 of protective barriers 602 and corner assemblies 100 that can be oriented around an asset (e.g., an electrical power transformer) according to additional embodiments of the present disclosure. Similar to the corner assemblies 100 described above in regard to FIGS. 1A-2, each of the protective barriers 602 may a platform structure 604 and a barrier structure 606 extending vertically upward from the platform structure 604. The platform structure 604 may be similar to the platform structure 102 of the corner assemblies 100.

Each of the barrier structure 606 may include two rail members 608, 610, at least one respective protective member assembly 612, and at least two cross members 614, 616. The two rail members 608, 610, the at least one respective protective member assembly 612, and the at least two cross members 614, 616 may form a structure similar to the structure described above in regard to FIGS. 1A-2 and the first rail member 112, the second rail member 114, the at least one first protective member assembly 122, and the plurality of cross members 120a-120d. Furthermore, a center of gravity of the protective barriers 602 may be similar or the same of the center of gravity (FIGS. 1A and 1B) of the corner assemblies 100. The fence structure 600 described in regard to FIG. 6 may provide the same advantages as described above in regard to the fence structure 500 of FIG. 5.

Figure 7:
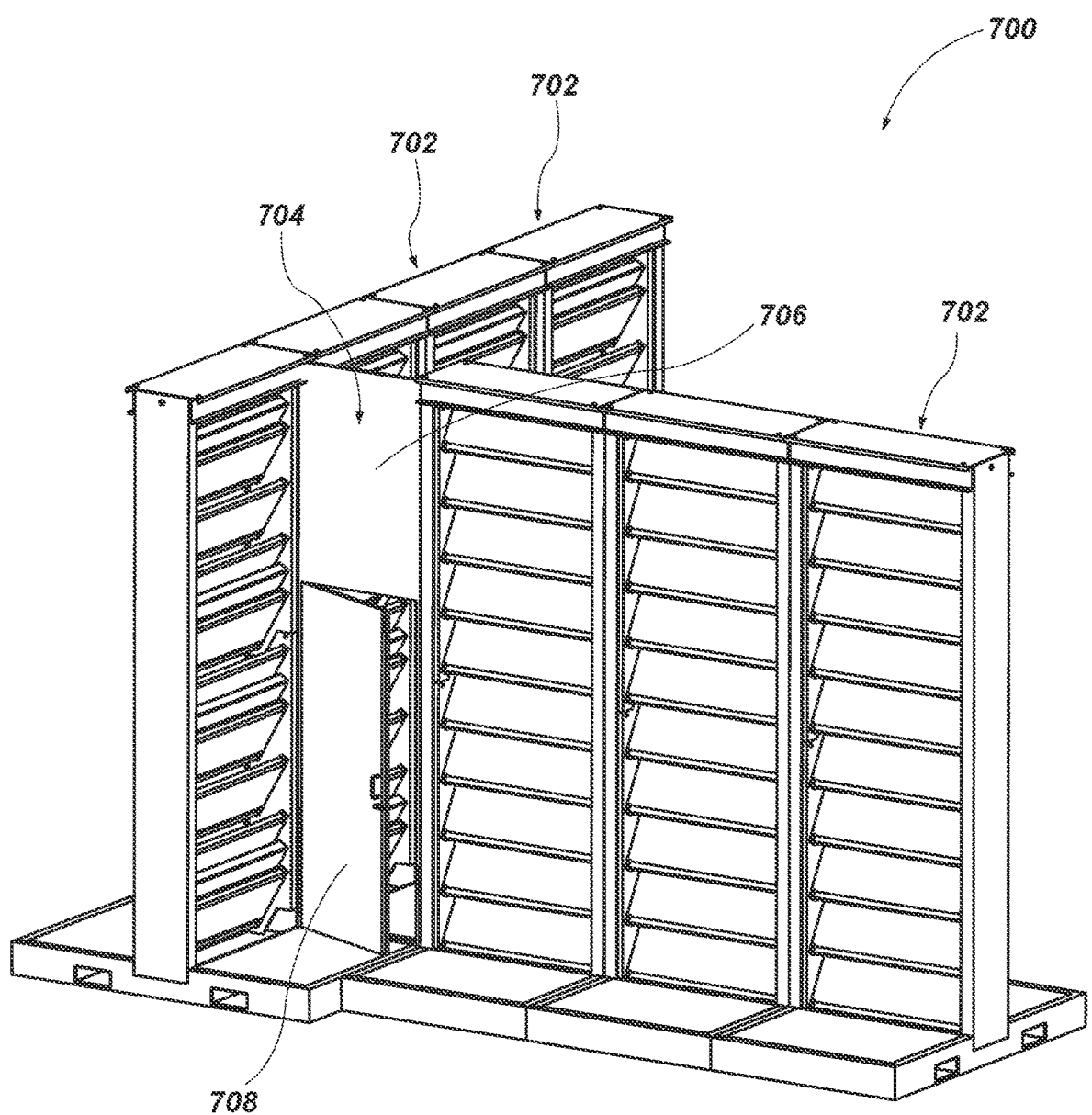
FIG. 7 is a perspective view of a fence structure including protective bathers and spanning assemblies according to one or more embodiments of the disclosure.

FIG. 7 shows a perspective view of a portion of a fence structure 700 of protective barriers 702 that can be oriented around an asset (e.g., an electrical power transformer) according to additional embodiments of the present disclosure. In some embodiments, the fence structure 700 of protective barriers 702 may not include a corner assembly 100 (FIG. 1A). Rather, the fence structure 700 may include a spanning assembly 704 that spans a distance between protective barriers 702 at junctions (e.g., meetings) of the walls of protective barriers 702 to connect one wall to another and to seal gaps between walls.

The spanning assembly 704 may include a panel portion 706 and a door portion 708. The door portions 708 may be rotatably coupled to the panel portion 706 and/or a protective barrier 602 and may provide access to an interior of the fence structure 700. In some embodiments, the spanning assembly 704 may include a low carbon steel. For example, the low carbon steel may include A36 steel as classified by ASTM.

Figure 8:
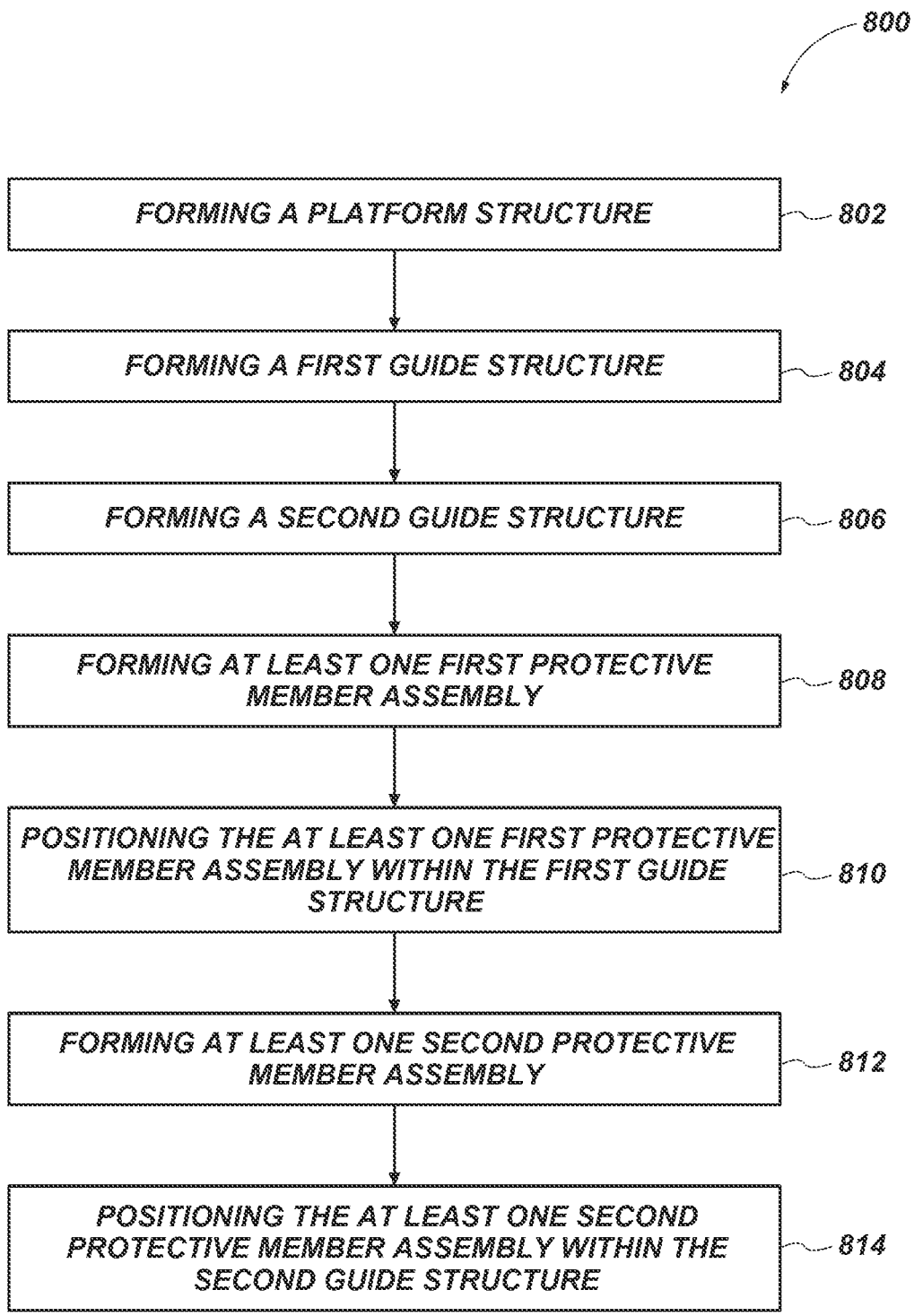
FIG. 8 shows a flowchart of a method of forming a corner assembly according to embodiments of the disclosure.

Embodiments of the disclosure include methods of forming a corner assembly. FIG. 8 shows a flowchart of a method 800 of forming a corner assembly according to embodiments of the disclosure. Referring to FIGS. 1A-8 together, the method 800 of forming a corner assembly 100 may include forming a platform structure 102, as shown in act 802 of FIG. 8. Forming the platform structure 102 may include forming an outer shell 108 and disposing an inner material 111 within the outer shell 108. The outer shell 108 and inner material 111 may include any of the materials described above in regard to FIGS. 1A-2.

The method 800 further includes forming a first guide structure 134 extending upward from the platform structure 102, as shown in act 804 of FIG. 8. Forming the first guide structure 134 may include connecting a first rail member 112 to a second rail member 114 via one or more cross members 120a-120d and disposing lower longitudinal ends of the first rail member 112 and the second rail member 114 within a recess 103 defined within an upper surface of the platform structure 102.

The method 800 may also include forming a second guide structure 136 extending upward from the platform structure 102, as shown in act 806 of FIG. 8. Forming the second guide structure 136 may include connecting a third rail member 116 to a fourth rail member 118 via one or more cross members 120a-120d and disposing lower longitudinal ends of the third rail member 116 and the fourth rail member 118 within the recess 103 defined within an upper surface of the platform structure 102.

Additionally, the method 800 may include forming at least one first protective member assembly 122, as shown in act 808 of FIG. 8. In some embodiments, forming the first protective member assembly 122 includes securing a first longitudinal end of a protective member 140 of a first plurality of protective members to a first side member 178 and securing a second longitudinal end of each protective member of the first plurality of protective members to a second side member 180. In one or more embodiments, securing the protective members 140 may include orienting a center lateral axis of each protective member 140 of the first plurality of protective members to form an acute angle with a horizontal plane within a range of 55 to 75 degrees when the first protective member assembly 122 is installed in the corner assembly.

The method 800 may also include positioning the first protective member assembly 122 within the first guide structure 134, as shown in act 810 of FIG. 8. For example, the first protective member assembly 122 may be slid within the first guide structure 134.

Additionally, the method 800 may include forming at least one second protective member assembly 125, as shown in act 812 of FIG. 8. In some embodiments, forming the second protective member assembly 125 includes securing a first longitudinal end of a protective member 140 of a second plurality of protective members to a first side member 178 and securing a second longitudinal end of each protective member of the first plurality of protective members to a second side member 180. In one or more embodiments, securing the protective members 140 may include orienting a center lateral axis of each protective member 140 of the first plurality of protective members to form an acute angle with a horizontal plane within a range of 55 to 75 degrees when the second protective member assembly 125 is installed in the corner assembly.

The method 800 may also include positioning the second protective member assembly 125 within the second guide structure 136, as shown in act 814 of FIG. 8. For example, the second protective member assembly 125 may be slid within the first guide structure 135. In view of the foregoing, the method 800 may include forming any of the corner assemblies and fence structures described above in regard to FIGS. 1A-7.

Some embodiments of the disclosure further include forming fences structures (e.g., fence structures 500, 600, 700).

The embodiments of the disclosure described above and illustrated in the accompanying drawings do not limit the scope of the disclosure, which is encompassed by the scope of the appended claims and their legal equivalents. Any equivalent embodiments are within the scope of this disclosure. Indeed, various modifications of the disclosure, in addition to those shown and described herein, such as alternative useful combinations of the elements described, will become apparent to those skilled in the art from the description. Such modifications and embodiments also fall within the scope of the appended claims and equivalents.

What is claimed is:

1. A corner assembly, comprising:
   a platform structure; and
   a barrier structure extending vertically upward from the platform structure, the barrier structure comprising:
   a first rail member extending vertically upward from the platform structure;
   a second rail member extending vertically upward from the platform structure and oriented at least substantially parallel to the first rail member;
   a third rail member extending vertically upward from the platform structure and abutting a lateral side of the first rail member;
   a fourth rail member extending vertically upward from the platform structure and oriented at least substantially parallel to the third rail member;
   a first protective member assembly disposed between the first rail member and the second rail member, the first protective member assembly comprising a first plurality of vertically adjacent protective members extending horizontally between the first rail member and the second rail member in a first direction; and
   a second protective member assembly disposed between the third rail member and the fourth rail member, the second protective member assembly comprising a second plurality of vertically adjacent protective members extending horizontally between the third rail member and the fourth rail member in a second direction,
   wherein a center lateral axis of each protective member of the first and second pluralities of vertically adjacent protective members forms an acute angle with a horizontal plane within a range of 55 degrees to 75 degrees.

2. The corner assembly of claim 1, wherein the platform structure comprises a recess defined within an upper surface of the platform structure, and wherein a lower longitudinal end of the barrier structure is disposed within the recess.

3. The corner assembly of claim 1, wherein the platform structure comprises:
   an outer shell; and
   an inner material disposed within the outer shell.

4. The corner assembly of claim 3, wherein the outer shell comprises a low carbon steel, and wherein the inner material comprises concrete.

5. The corner assembly of claim 1, wherein the acute angle is about 60 degrees.

6. The corner assembly of claim 1, wherein the first direction in which the first plurality of vertically adjacent protective members extend horizontally is perpendicular to the second direction in which the second plurality of vertically adjacent protective members extend horizontally.

7. The corner assembly of claim 1, wherein each protective member of the first and second pluralities of vertically adjacent protective members comprises:
   a plate;
   a first frame member extending along at least a portion of a first lateral edge of the plate proximate each end thereof;
   a second frame member extending along at least a portion of a second, opposite lateral edge of the plate proximate each end thereof, and
   at least one shock absorber extending around portions of each of the first frame member and the second frame member proximate longitudinal ends of the protective member.

8. The corner assembly of claim 1, wherein a center of gravity of the corner assembly is a distance from the horizontal plane that is less than or substantially equal to half of an overall height of the corner assembly.

9. The corner assembly of claim 1, wherein a lower lateral end of a first protective member of the first plurality of vertically adjacent protective members is lower than an upper lateral end of an adjacent second protective member below the first protective member.

10. A fence structure, comprising:
   a first wall comprising protective barriers and extending in a first direction;
   a second wall comprising protective barriers and extending in a second direction, wherein the first direction is perpendicular to the second direction; and
   a corner assembly disposed at a junction of the first wall and the second wall and coupled to the first wall and the second wall, the corner assembly comprising:
      a platform structure; and
      a barrier structure extending vertically upward from the platform structure, the barrier structure comprising:
         a first guide structure extending vertically upward from the platform structure;
         a second guide structure extending vertically upward from the platform structure;
         a first protective member assembly disposed within the first guide structure and comprising:
            a first side member;
            a second side member; and
            a first plurality of vertically adjacent protective members extending horizontally between the first side member and the second side member in a first direction; and
         a second protective member assembly disposed with the second guide structure comprising:
            a third side member;
            a fourth side member; and
            a second plurality of vertically adjacent protective members extending horizontally between the third side member and the fourth side member in a second direction that is perpendicular to the first direction,
         wherein a center lateral axis of each protective member of the first and second pluralities of vertically adjacent protective members forms an acute angle with a horizontal plane within a range of 55 degrees to 75 degrees.

11. The fence structure of claim 10, wherein the first protective member assembly has a first width in the first direction that is greater than a second width of the second protective member assembly in the second direction.

12. The fence structure of claim 10, wherein the first plurality of vertically adjacent protective members and the second plurality of vertically adjacent protective members each comprise MIL-DTL-46100 wrought steel.

13. The fence structure of claim 10, the first and second side members of the first protective member assembly having a first plurality of slots defined therein for receiving and securing longitudinal ends of the protective members of the first plurality of vertically adjacent protective members.

14. The fence structure of claim 10, wherein a lower lateral end of a first protective member of the first plurality of vertically adjacent protective members is lower than an upper lateral end of an adjacent second protective member below the first protective member.

15. The fence structure of claim 10, wherein each of the protective barriers comprises:
   a first A-frame structure having a first leg and a second leg, the first leg defining a first channel;
   a second A-frame structure laterally spaced from and oriented parallel to the first A-frame structure and having a third leg and a fourth leg, the third leg defining a second channel; and
   a first protective member assembly extending laterally between the first leg and the third leg, the first protective member assembly comprising:
      an elongated first side member located adjacent and parallel to the first leg and within the first channel of the first leg;
      an elongated second side member located adjacent and parallel to the third leg and within the second channel of the third leg; and
      a first plurality of vertically adjacent protective members extending substantially horizontally between the first side member and the second side member, wherein a center lateral axis of each protective member of the first plurality of vertically adjacent protective members forms a first included angle with a horizontal plane within a range of 55 to 75 degrees.

16. The fence structure of claim 10, wherein each of the protective barriers comprises:
   a platform structure; and
   a barrier structure extending vertically upward from the platform structure.

17. The barrier of claim 10, wherein a center of gravity of the corner assembly is a distance from the horizontal plane that is less than or substantially equal to half of an overall height of the corner assembly.

18. A method of making a corner assembly, comprising:
   forming a platform structure;
   forming a first guide structure extending upward from the platform structure;
   forming a second guide structure extending upward from the platform structure;
   forming a first protective member assembly comprising:
      orienting a center lateral axis of each protective member of a first plurality of protective members to form an acute angle with a horizontal plane when the first protective member assembly is installed in the corner assembly within a range of 55 to 75 degrees;

securing a first longitudinal end of each protective member of the first plurality of protective members to a first side member such that the acute angle is maintained; and securing a second longitudinal end of each protective member of the first plurality of protective members to a second side member;

positioning the first protective member assembly within the first guide structure;

forming a second protective member assembly comprising:

orienting a center lateral axis of each protective member of a second plurality of protective members to form an acute angle with a horizontal plane when the second protective member assembly is installed in the corner assembly within a range of 55 to 75 degrees;

securing a first longitudinal end of each protective member of the second plurality of protective members to a third side member such that the acute angle is maintained; and securing a second longitudinal end of each protective member of the second plurality of protective members to a fourth side member; and sliding the second protective member assembly into the second guide structure.

19. The method of claim 18, wherein forming the platform structure comprises:

forming an outer shell; and disposing an inner material into the outer shell.

20. The method of claim 19, wherein disposing the inner material into the outer shell comprises disposing concrete into the outer shell.

\* \* \* \* \*

UNITED STATES PATENT AND TRADEMARK OFFICE
CERTIFICATE OF CORRECTION

PATENT NO. : 11,788,320 B2
APPLICATION NO. : 17/249510
DATED : October 17, 2023
INVENTOR(S) : Kenneth R. Bratton et al.

It is certified that error appears in the above-identified patent and that said Letters Patent is hereby corrected as shown below:

In the Specification

| | | |
|---|---|---|
| Column 1, | Line 8, | change "Number DE-AC07-051D14517 awarded" to --Number DE-AC07-05ID14517 awarded-- |
| Column 2, | Line 15, | change "protective bathers and" to --protective barriers and-- |
| Column 2, | Line 23, | change "The bather structure" to --The barrier structure-- |
| Column 3, | Line 40, | change "protective bathers and" to --protective barriers and-- |
| Column 7, | Line 33, | change "the bather structure" to --the barrier structure-- |
| Column 13, | Line 33, | change "sturctures 134, 136" to --structures 134, 136-- |
| Column 13, | Line 66, | change "protective bathers 502" to --protective barriers 502-- |
| Column 16, | Line 5, | change "structure 135. In" to --structure 134. In-- |

In the Claims

| | | | |
|---|---|---|---|
| Claim 7, | Column 17, | Line 18, | change "end thereof, and" to --end thereof; and-- |

Signed and Sealed this
Twenty-seventh Day of August, 2024

Katherine Kelly Vidal
*Director of the United States Patent and Trademark Office*